(12) United States Patent
Masunaga et al.

(10) Patent No.: US 9,983,317 B2
(45) Date of Patent: May 29, 2018

(54) SIGNAL PROCESSING DEVICE AND RADIATION MEASUREMENT DEVICE

(71) Applicant: FUJI ELECTRIC CO., LTD., Kawasaki (JP)

(72) Inventors: Yasuyuki Masunaga, Kawasaki (JP); Takamasa Asano, Kawasaki (JP); Kazuhiro Koizumi, Kawasaki (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 0 days. days.

(21) Appl. No.: 15/198,614

(22) Filed: Jun. 30, 2016

(65) Prior Publication Data

US 2017/0059718 A1    Mar. 2, 2017

(30) Foreign Application Priority Data

Aug. 25, 2015 (JP) ................. 2015-165600

(51) Int. Cl.
*G01T 1/18* (2006.01)
*G01T 1/02* (2006.01)
*G01T 1/17* (2006.01)

(52) U.S. Cl.
CPC ............. *G01T 1/18* (2013.01); *G01T 1/023* (2013.01); *G01T 1/17* (2013.01)

(58) Field of Classification Search
CPC ............. G01T 1/18; G01T 1/17; G01T 1/023
See application file for complete search history.

(56) References Cited

U.S. PATENT DOCUMENTS

| 2015/0012249 A1* | 1/2015 | Li | G01R 29/26 702/191 |
| 2015/0188556 A1* | 7/2015 | Chen | H03M 1/188 341/153 |
| 2015/0207557 A1* | 7/2015 | Kasai | H03F 1/26 375/349 |
| 2016/0356896 A1* | 12/2016 | Masunaga | G01T 1/17 |

FOREIGN PATENT DOCUMENTS

JP    2013-135244 A    7/2013

OTHER PUBLICATIONS

J. J. Collins et al., "Stochastic resonance without tuning", Letters to Nature, vol. 376, pp. 236-238, Jul. 20, 1995.

* cited by examiner

*Primary Examiner* — Christine S Kim
(74) *Attorney, Agent, or Firm* — Rabin & Berdo, P.C.

(57) ABSTRACT

A signal processing device for detecting a weak signal in an input signal. The device includes first and second pulse detectors and a determining circuit. The first pulse detector adds noise to the input signal, and processes the noise-added signal using a first threshold, to thereby output a first signal having a first pulse waveform component, which corresponds to an interval in which a level of the noise-added input signal exceeds the first threshold. The second pulse detector receives the input signal in parallel with the first pulse detector, and processes the input signal using a second threshold, to thereby output a second signal having a second pulse waveform component, which corresponds to an interval in which a level of the input signal exceeds the second threshold. The determining circuit determines whether each of the first and second pulse waveform components conforms to the weak signal.

8 Claims, 5 Drawing Sheets

SIGNAL PROCESSING DEVICE AND RADIATION MEASUREMENT DEVICE

CROSS REFERENCE TO RELATED APPLICATION

This application is based upon and claims the benefit of priority from the prior Japanese Patent Application No. 2015-165600, filed on Aug. 25, 2015; the entire contents of which are incorporated herein by reference.

BACKGROUND OF THE INVENTION

1. Field of the invention

The present invention relates to a signal processing device for detecting weak signals and a radiation measurement device using the signal processing device.

2. Description of the Related Art

Recently, there has been studied a method of using Stochastic Resonance (SR) to detect weak signals buried in background noise. For example, there is known the method of adding noise to an input signal containing a weak signal thereby to cause stochastic resonance in the weak signal (for example, see Japanese Patent Application Publication No. 2013-135244, referred to as "JP2013-135244A" below). In this method for causing stochastic resonance, a noise added signal is subjected to threshold processing and converted into a binary signal thereby to reproduce a weak signal.

However, a stochastic resonance circuit disclosed in JP2013-135244A is configured to add noise to an input signal containing a weak signal, and such a stochastic resonance circuit has a problem that, depending on an SN (Signal-Noise) ratio representing a ratio of a weak signal as a detection target to background noise, addition of noise may cause deterioration in the SN ratio of the weak signal. For example, assuming that a weak signal as a detection target has a much higher signal level than background noise, if the noise is added to an input signal to cause stochastic resonance, the SN ratio of the weak signal may be degraded to disable reproduction of the weak signal.

SUMMARY OF THE INVENTION

The present invention aims to provide a signal processing device and a radiation measurement device capable of improving the detection accuracy of a weak signal as measurement target contained in an input signal, covering a wide range of weak signals including weak signals of poor SN ratio and weak signals of sufficiently good SN ratio.

One aspect of the present invention is a signal processing device comprising: a first pulse detector configured to receive an input signal containing a measurement target weak signal, perform threshold processing using a first threshold value on a noise added signal that is the input signal added with a noise, and output a first threshold processing signal having a pulse waveform of a weak signal that exceeds the first threshold value; a second pulse detector configured to receive the input signal in parallel with the first pulse detector, performs threshold processing using a second threshold value on the input signal, and output a second threshold processing signal having a pulse waveform of a weak signal that exceeds the second threshold value; and a determining circuit configured to determine whether a pulse waveform component contained in each of the first threshold processing signal and the second threshold processing signal conforms to the weak signal.

Another aspect of the present invention is a radiation measurement device comprising: a radiation detector configured to output a detection signal containing a weak signal in accordance with energy of an incident radiation; a signal processor configured to receive the detection signal from the radiation detector and detect the weak signal from the detection signal; and a dosimeter configured to calculate a radiation dose based on an output signal from the signal processor, wherein the signal processor comprises: a first pulse detector configured to receive an input signal containing a measurement target weak signal, perform threshold processing using a first threshold value on a noise added signal that is the input signal added with a noise, and output a first threshold processing signal including a pulse waveform of a weak signal that exceeds the first threshold value; a second pulse detector configured to receive the input signal in parallel with the first pulse detector, performs threshold processing using a second threshold value on the input signal, and output a second threshold processing signal containing a pulse waveform of a weak signal that exceeds the second threshold value; and a determining circuit configured to determine whether a pulse waveform component contained in each of the first threshold processing signal and the second threshold processing signal conforms to the weak signal, and the dosimeter calculates the radiation dose by applying a dose coefficient that is provided in accordance with an amplification level of each of the weak signals at the first pulse detector and the second pulse detector individually.

DETAILED DESCRIPTION OF THE INVENTION

With reference to the attached drawings, embodiments of the present invention will be described in detail below.
(First Embodiment)

Figure 1:
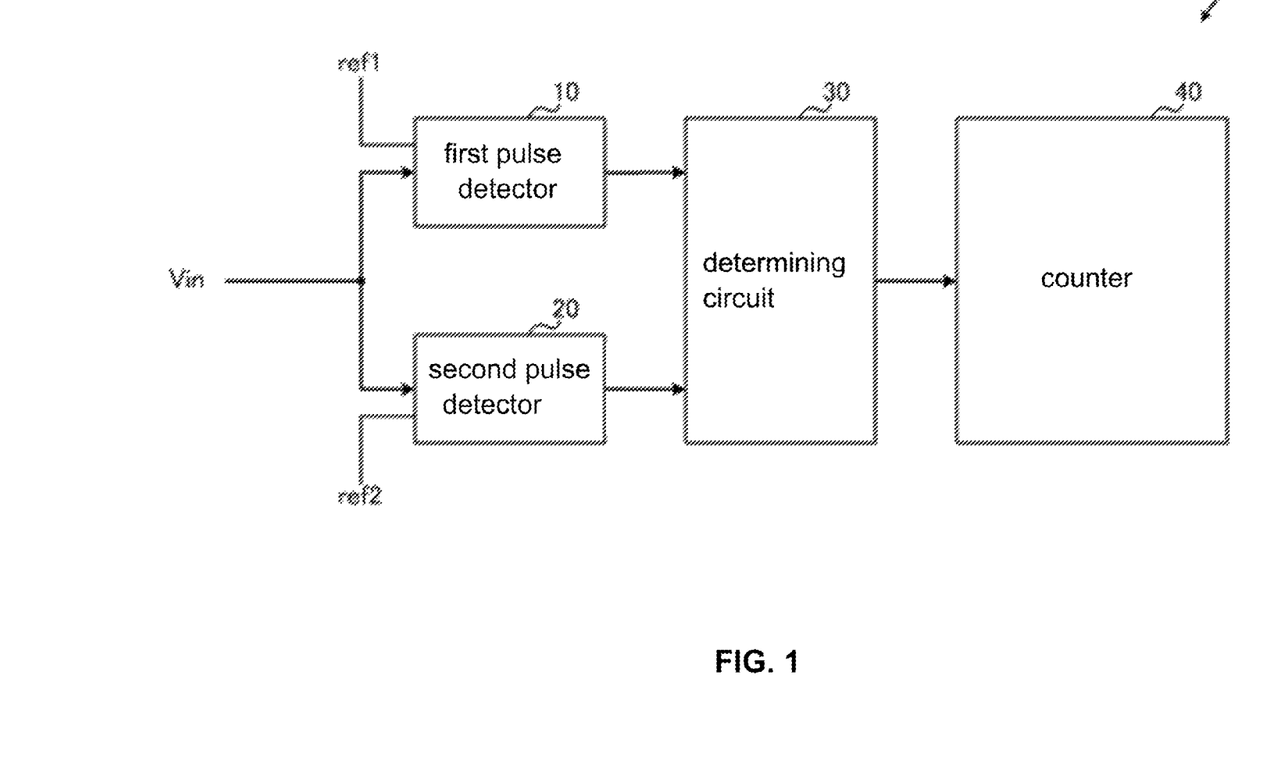
FIG. 1 is a block diagram illustrating the configuration of a signal processing device according to a first embodiment.

FIG. 1 is a block diagram illustrating the configuration of a signal processing device according to the first embodiment of the present invention. The signal processing device according to the present embodiment is applicable to various devices for detecting weak signals using stochastic resonance.

As illustrated in FIG. 1, the signal processing device according to the first embodiment has: a first pulse detector 10 that serves as a stochastic resonance section for adding noise to an input signal Vin containing a weak signal as a measurement target (referred to as "measurement target weak signal") thereby to cause stochastic resonance; a second pulse detector 20 that receives the input signal Vin containing the measurement target weak signal in parallel with the first pulse detector 10 and performs threshold processing without applying noise; a determining circuit 30 that determines whether an output signal from each of the first pulse detector 10 and the second pulse detector 20 contains a reproduced weak signal or not and outputs a signal having a pulse waveform component conforming to the determined weak signal; and a counter 40 that counts pulses corresponding to the weak signal contained in the output signal from the determining circuit 30. The determining circuit 30 and the counter 40 may be consisted by a personal computer including a processor, a memory and other circuits. Software realizing the function of the determining circuit 30 and the counter 40 may be installed to the memory and executed in the processor.

Figure 2:
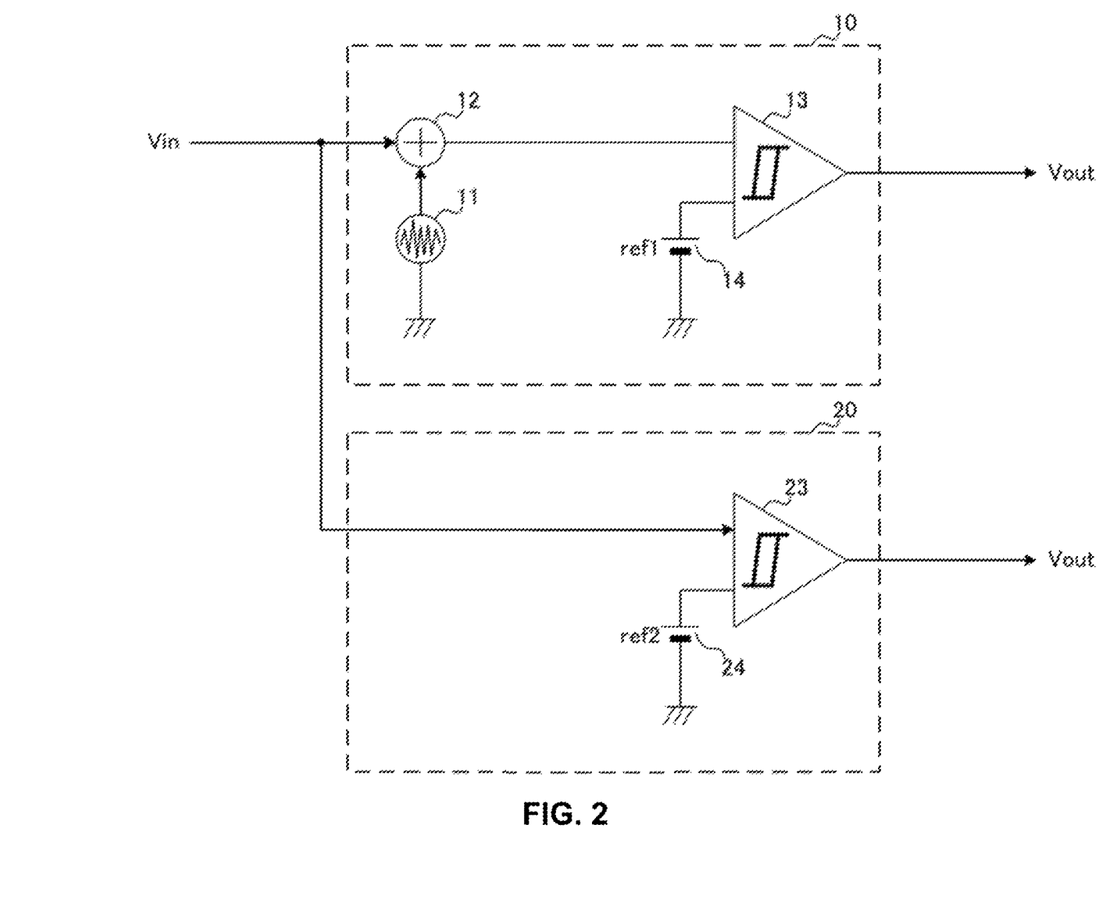
FIG. 2 is a circuit diagram illustrating the configuration of the signal processing device according to the first embodiment.

FIG. 2 illustrates a circuit diagram of the signal processing device 1 according to the first embodiment. As illustrated in FIG. 2, the first pulse detector 10 has: a noise generator 11 for generating noise; a noise adder 12 for adding noise generated by the noise generator 11 to the input signal Vin to output a noise added signal; a first comparator 13 having input terminals, one input terminal being for receiving the noise added signal and the other input terminal being for receiving a first threshold value ref1, the first comparator 13 for comparting the noise added signal with the first threshold value ref1 to generate a first threshold processing signal; and a voltage source 14 for supplying a reference voltage, which is the first threshold value ref1, to the other input terminal of the first comparator 13. The noise generator 11 is able to set the noise strength of noise to generate. In addition, the first comparator 13 is configured as a comparator having hysteresis property. Noise generated by the noise generator 11 may be noise having the same strength over a wide band that is at least wider than the frequency of a measurement signal. The noise generated by the noise generator 11 may be white noise, Gaussian noise (white Gaussian noise), 1/f fluctuation noise or the like.

In the second pulse detector 20, one input terminal of a second comparator 23 receives an input signal Vin and the other input terminal of the second comparator 23 receives a second threshold value ref2. The second threshold value ref2 is supplied from a voltage source 24 as a reference voltage. The second comparator 23 compares the input signal Vin with no noise added, with the second threshold value ref2 to generate a second threshold processing signal. Here, the second comparator 23 is configured to be a comparator having hysteresis property.

Next description is made about the operation of the signal processing device according to the first embodiment.

Figure 3:
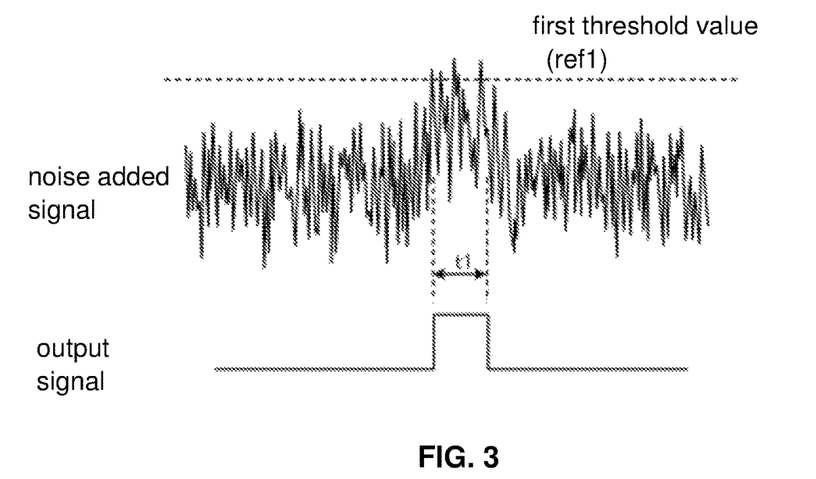
FIG. 3 is a diagram illustrating the relationship between a noise-added signal and an output signal in a first comparator.

FIG. 3 is a schematic diagram illustrating the relationship between a noise added signal to be input to the first comparator 13 and an output signal output from the first comparator 13. The noise added signal illustrated in FIG. 3 is a signal generated by adding noise generated by the noise generator 11 to an input signal Vin having a measurement target weak signal. In the interval t1 of the noise added signal, there is shown a pulse waveform component conforming to the measurement target weak signal.

The first comparator 13 compares the noise added signal with the first threshold value ref1 and when the noise added signal is greater than the first threshold value ref1, the first comparator 13 outputs a high level signal (for example, 1) and when the noise added signal is smaller than the first threshold value ref1, the first comparator 13 outputs a low level signal (for example, 0). Thus, the first comparator 13 performs threshold processing using the first threshold value ref1 on the input noise added signal and outputs the first threshold processing signal having a pulse waveform component conforming to the weak signal. The first pulse detector 10 outputs the first threshold processing signal from an output end of the first comparator 13 to the determining circuit 30.

Here, in the first pulse detector 10, the input signal Vin is added with a noise of given strength at the noise adder 12, which causes a stochastic resonance phenomenon. Due to this stochastic resonance phenomenon, in the interval t1 where the measurement target weak signal appears in the input signal Vin, the signal level is suddenly likely to exceed a certain threshold, as compared to the signal level in the other interval than t1 where the weak signal does not appear. In consideration of a difference between the signal level at the interval t1 where the weak signal appears and the signal level at the other interval than t1 where no weak signal appears, the first threshold value ref1 suitable to extract the interval t1 where the weak signal appears (that is, extract the weak signal itself) is set in the first comparator 13. Since the first comparator 13 is a comparator having hysteresis property, the output signal of the first comparator 13 is a signal including a pulse waveform component that is high in the interval t1 corresponding to the measurement target weak signal as illustrated in FIG. 3.

Thus, in the first pulse detector 10, an input signal having a measurement target weak signal is added with a noise of given strength to cause stochastic resonance and then, the resultant is subjected to threshold processing. With this process, in a measurement environment where a weak signal is buried in background noise or SN ratio <1 (the SN ratio represents a strength ratio of the weak signal to background noise), it is possible to reproduce and extract the measurement target weak signal. The first comparator 13 outputs a first threshold processing signal having a pulse waveform component that indicates high level in the interval t1 corresponding to the measurement target weak signal.

Figure 4:
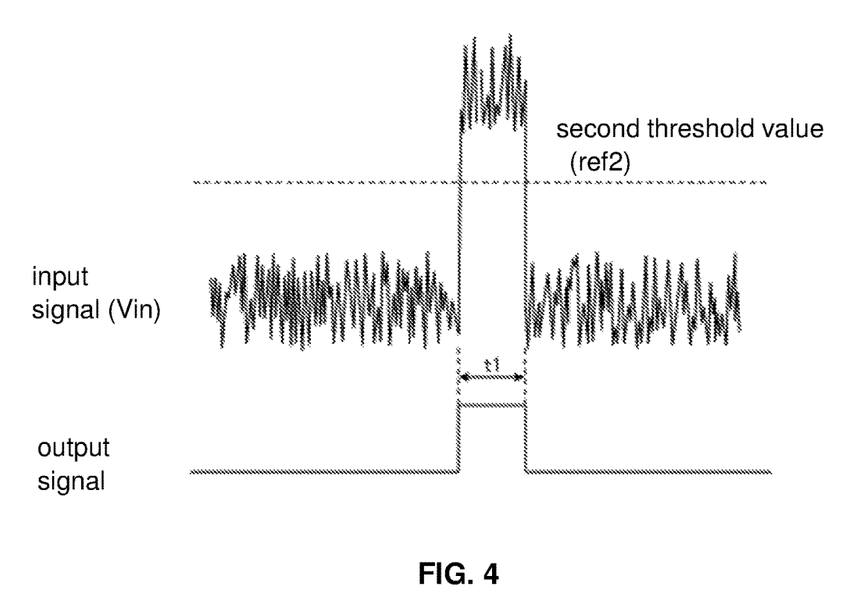
FIG. 4 is a diagram illustrating the relationship between an input signal containing a weak signal and an output signal in a second comparator.

On the other hand, in the second pulse detector 20, the input signal Vin is not added with a noise. The input signal Vin is subjected to threshold processing using the second threshold value ref2 that is suitable to extract the measurement target weak signal from the input signal Vin. FIG. 4 is a schematic diagram illustrating the relationship between the input signal Vin to be input to the second pulse detector 20 and an output signal output from the second comparator 23. The input signal Vin illustrated in this figure is shown having a measurement target weak signal of which the signal level is relatively much higher than that of the background noise. Pulses of the measurement target weak signal are shown in the interval t1.

The second comparator 23 compares the input signal Vin with the second threshold value ref2 and when the input signal Vin is greater than the second threshold value ref2, the second comparator 23 outputs a high level signal (for example, 1) and when the input signal Vin is smaller than the second threshold value ref2, the second comparator 23 outputs a low level signal (for example, 0). Here, in a measurement environment where a weak signal is not buried in background noise (for example, SN ratio >1), even without using stochastic resonance phenomenon, the signal level of the input signal Vin exceeds a certain threshold value in the interval t1 where the measurement target weak signal appears, as compared to the signal level in the other interval than t1 where the measurement target weak signal does not appear. If this input signal Vin of better SN ratio is added with noise to cause stochastic resonance, the measurement target weak signal is rather deteriorated, resulting in poor detection accuracy.

Then, in consideration of a difference between the signal level of the background noise and the signal level of the measurement target weak signal in the input signal Vin not added with a noise and having no stochastic resonance, the second threshold value ref2 is determined. In this example, the second threshold value ref2 is preferably greater than the background noise (expected average background noise) of the input signal Vin and smaller than the peak value of the measurement target weak signal (expected average weak signal peak value). As the second threshold value ref2 is thus set, in a measurement environment where the signal level of the weak signal is higher than that of the background noise included in the input signal Vin, it is possible to reproduce and extract the measurement target weak signal using the second threshold value ref2, without causing signal deformation due to noise addition. The second comparator 23 outputs the second threshold processing signal including a pulse waveform component that shows high level in the interval t1 corresponding to the measurement target weak signal.

The determining circuit 30 receives the first threshold processing signal and the second threshold processing signal in parallel, from the first pulse detector and the second pulse detector 20, respectively, and determines whether it is a measurement target weak signal included in the input signal Vin or not. The first threshold processing signal and the second threshold processing signal each contain a pulse component due to other noise, other than the pulse waveform component corresponding to the measurement target weak signal. The determining circuit 30 has a parameter (pulse width, etc.) to specify a pulse waveform component conforming to the measurement target weak signal. The determining circuit 30 uses this parameter as a basis to determine whether the pulse waveform component contained in each of the input first threshold processing signal and the second threshold processing signal is the pulse waveform component conforming to the measurement target weak signal. When the determining circuit 30 detects the pulse waveform components conforming to the measurement target weak signals in both of the first threshold processing signal and the second threshold processing signal, the determining circuit 30 selects the weak signal detected in the second threshold processing signal. That is, the determining circuit 30 preferentially selects the weak signal (pulse waveform) that is reproduced by the threshold processing in the second pulse detector 20 without addition of noise.

Then, the determining circuit 30 outputs a determination signal of the weak signal detected from the first threshold processing signal or the second threshold processing signal to a counter 40. At this time, the determining circuit 30 outputs, apart from the determination signal or in addition to the determination signal, information indicating whether the weak signal comes from the first threshold processing signal or the second threshold processing signal for the purpose of processing in a later step.

In the first embodiment, when the weak signal has a higher signal level than the background noise (for example, SN ratio >1), the pulse waveform reproduced in the second threshold processing signal output from the second comparator 23 has higher reliability of being the weak signal than the pulse waveform contained in the first threshold processing signal output from the first comparator 13. On the other hand, when the weak signal has a smaller signal level than the background noise (for example, SN ratio <1), the pulse waveform reproduced in the first threshold processing signal output from the first comparator 13 has higher reliability of being the weak signal than the pulse waveform contained in the second threshold processing signal output from the second comparator 23.

Accordingly, since determination as to whether there is a measurement target weak signal is performed for the first threshold processing signal output from the first pulse detector 10 and the second threshold processing signal output from the second pulse detector 20 in parallel, it is possible to improve the detection accuracy of a measurement target weak signal contained in an input signal Vin, covering a wide range of weak signals including weak signals of poor SN ratio and weak signals of sufficiently good SN ratio.

(Second Embodiment)

The second embodiment is an example of application of the signal processing device according to the above-mentioned first embodiment to the radiation measurement device.

Figure 5:
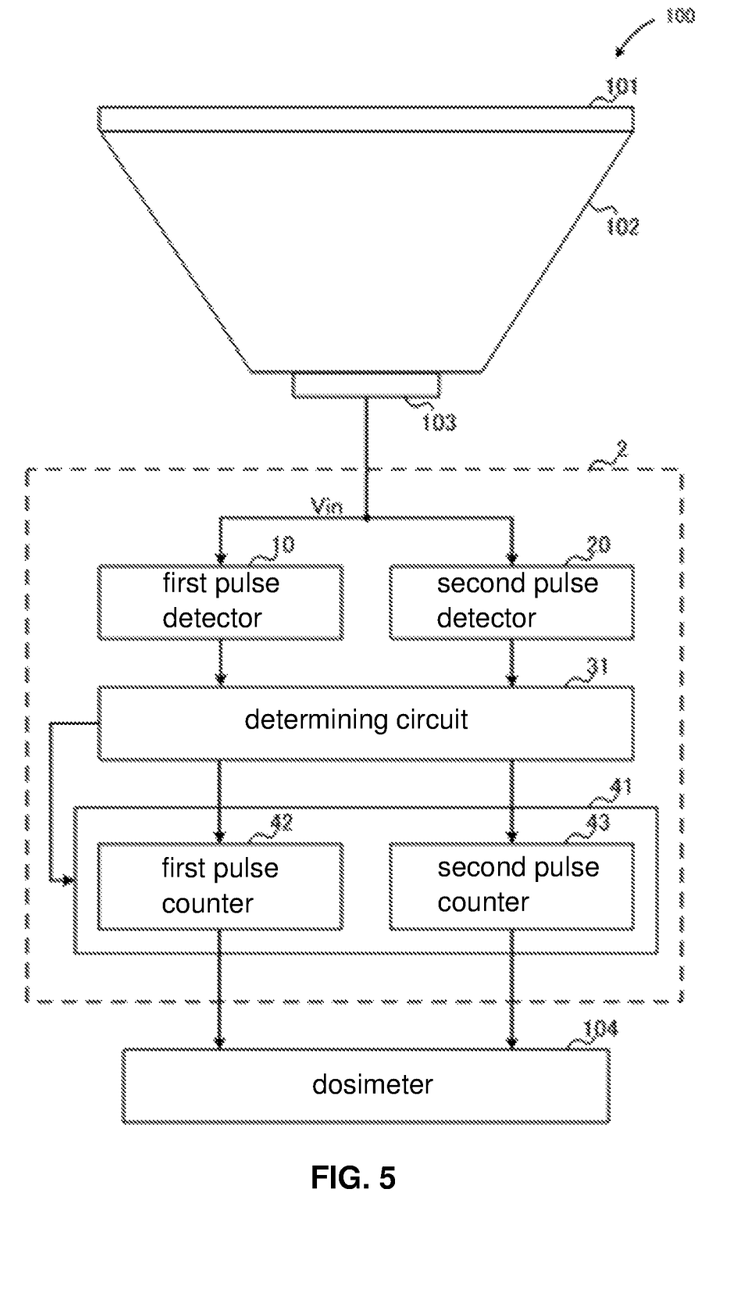
FIG. 5 is a block diagram illustrating the configuration of a radiation measurement device according to a second embodiment.

FIG. 5 is a block diagram illustrating the overall configuration of the radiation measurement device 100 according to the second embodiment of the present invention. In the second embodiment, it is possible to improve the detection probability of radiation as an input measurement target weak signal, covering a wide range of radiation including radiation of poor SN ratio and radiation of good SN ratio.

The radiation measurement device 100 has a scintillator 101 for generating scintillation light in accordance with input radiation, a light guide 102 for causing reflection of the scintillation light generated in the scintillator 101, a light detector 103 for outputting a weak signal in accordance with the scintillation light guided by the light guide 102, a signal processing device 2 for receiving the weak signal output from the light detector 103, and a dosimeter 104 for receiving a signal output from the signal processing device 2. In this example, structural elements of the scintillator 101, light guide 102 and light detector 103 are called a radiation detector.

The scintillator 101 is configured to, when radiation is input from the outside, generate scintillation light (fluorescence) in accordance with energy given from the radiation to the scintillator 101. The scintillation light generated in the scintillator 101 is input to the light guide 102, reflects repeatedly in the light guide 102 and arrives at the light detector 103. The light detector 103 outputs a weak signal in accordance with the incident radiation dose of the scintillation light by photo-electric effect and inputs the input signal Vin including this weak signal to the signal processing device 2.

The signal processing device 2 is identical in fundamental configuration to the signal processing device 1 according to the first embodiment, however, the signal processing device 2 has a counter 41 configured to perform pulse counting on the basis of the first threshold processing signal and the second threshold processing signal separately. Here, in the structural elements of the signal processing device 2, a structural element having the same function as that of the signal processing device 1 according to the first embodiment is described using like reference numeral.

The determining circuit 31 detects pulse waveforms corresponding to weak signals from the first threshold processing signal and the second threshold processing signal separately and outputs pulse determination results to the counters 41. When the weak signals are detected in both the first threshold processing signal and the second threshold processing signal simultaneously, the selection information for informing that the pulse determination result of the second threshold processing signal is only selected is given to the counter 41.

The counter 41 has a first pulse counter 42 for counting pulses of a weak signal reproduced based on the first threshold processing signal output from the first pulse detector 10 and a second pulse counter 43 for counting pulses of a weak signal reproduced based on the second threshold processing signal output from the second pulse detector 20. When the weak signals are detected in both the first threshold processing signal and the second threshold processing signal simultaneously, the first pulse counter 42 excludes a pulse determination result based on the first threshold processing signal by the selection signal (selection information) given from the determining circuit 31.

More specifically, in the counter 41, the first pulse counter 42 counts pulses from a pulse determination result of the first threshold processing signal and the second pulse counter 43 counts pulses from a pulse determination result of the second threshold processing signal. Then, the counter 41 inputs the numbers of pulses output from the first pulse counter 42 and the second pulse counter 43 into the dosimeter 104.

The dosimeter 104 converts the number of pulses counted in the first pulse counter 42 and the number of pulses counted in the second pulse counter 43 to radiation doses by applying respective appropriate dose coefficients for dosimetry. Here, the dose coefficients are coefficients for converting the numbers of pulses counted in the first pulse counter 42 and the second pulse counter 43 to radiation doses input to the scintillator 101. Since the amplification rate is different for the first pulse detector and the second pulse detector, the dose coefficients are prepared corresponding to the respective amplification rates of the weak signals in the first pulse detector and the second pulse detector.

Since the dosimeter 104 applies different dose coefficients to the number of pulses counted in the first pulse counter 42 ad the number of pulses counted in the second pulse counter 43, even if the weak signals are detected in two systems of different amplification rates, that is, the first pulse detector 10 and the second pulse detector 20, it is possible to calculate the incident radiation dose accurately.

Here, it is possible to obtain dose coefficients in the dosimeter 104 by inputting a fixed dose of radiation for a given length of time to the radiation measurement device 100 using a reference radiation source or the like. For example, suppose that a reference radiation is emitted from the reference radiation source at a fixed known rate. In such a case, the incident radiation dose for a fixed length of time of radiation input from the reference radiation source and the pulse shape of a weak signal are known. Therefore, by configuring the first pulse counter 42 and the second pulse counter 43 to count pulses for a given length of time upon reception of radiation, it is possible to obtain appropriate dose coefficients for the number of pulses counted in the first pulse counter 42 and the number of pulses counted in the second pulse counter 43.

The dose coefficients may be changed appropriately in accordance with the radionuclide and radiation types emitted.

In addition, in the above-mentioned embodiment, when the value of an input signal is same as a threshold value or more, the first comparator 13 or the second comparator 23 outputs 1, and the value of the signal is less than the threshold value, the first comparator 13 or the second comparator 23 outputs 0. However, the output from the first comparator 13 or the second comparator 23 is not limited to this. For example, the first comparator 13 or the second comparator 23 may output 0 when the value of the input signal is same as the threshold value or more, and the first comparator 13 or the second comparator 23 may output 1 when the value of the input signal is less than the threshold value.

Although the two detectors, that is, the first pulse detector 10 and the second pulse detector 20, are used in the above-described embodiments, the number of detectors is not limited to this. For example, there may be provided three or more detectors of different threshold values for binarization processing. Besides, the configuration of the determining circuit is not limited to that described above.

Figure 6:
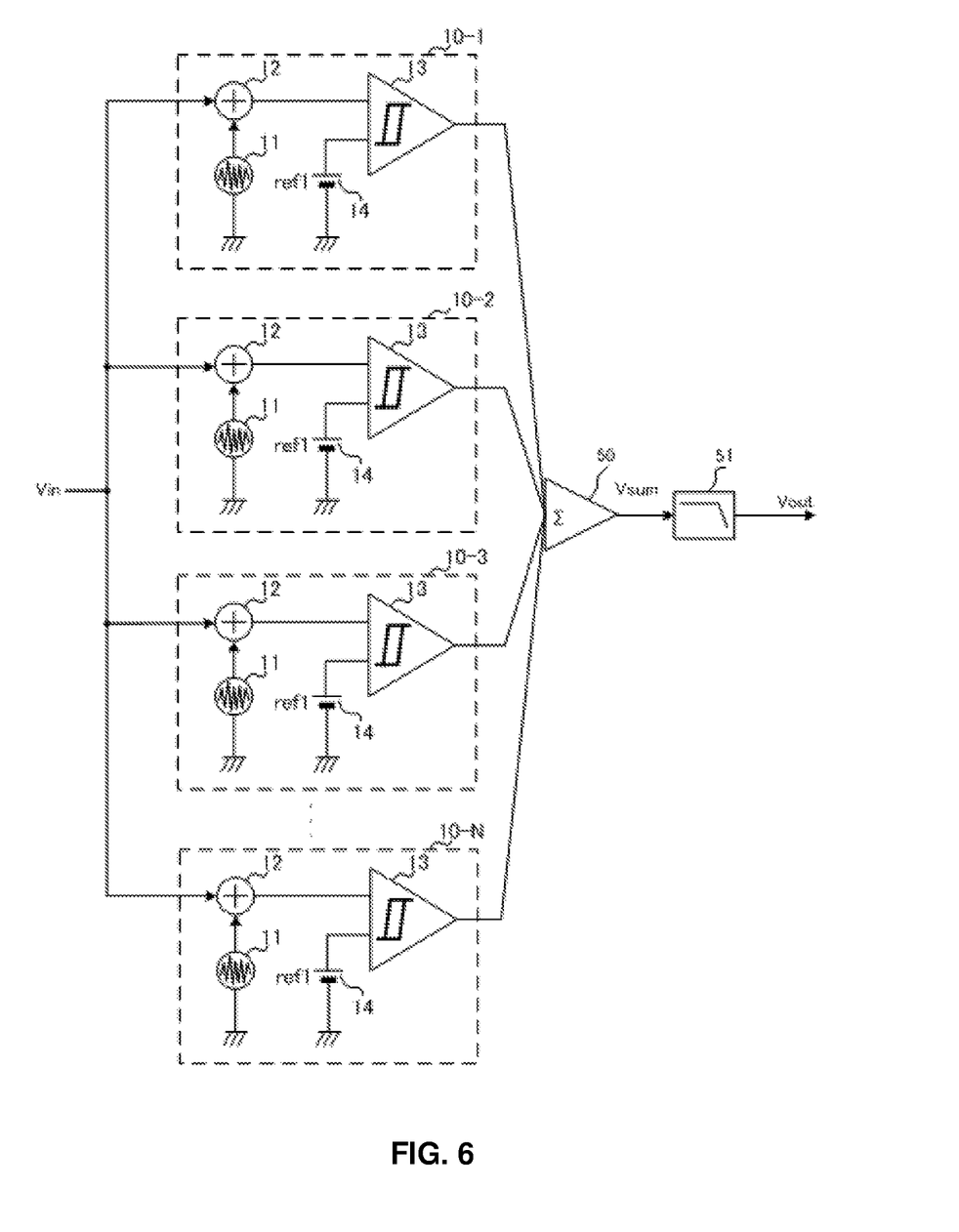
FIG. 6 is a circuit diagram illustrating another example of the signal processing device according to the first embodiment.

Further, though the single first pulse detector, that is, the first pulse detector 10, is only provided in the above-described embodiments, the number of the first pulse detector is not limited to this. For example, as illustrated in FIG. 6, it may be configured that a plurality of first pulse detectors 10-1 to 10-N are provided in parallel, measurement target weak signals are added with noise independently, and output signals from the first pulse detectors 10-1 to 10-N are added by an adder 50, the resultant signal is shaped into a rectangular wave by a waveform shaping section 51 consisting of a low-pass filter. The first threshold value ref1 to be set to the voltage source 14 may be a common value or may be adjusted independently. Since noises are thus applied to weak signals in the first pulse detectors 10-1 to 10-N independently, it is possible to further improve the SN ratio.

The present invention is not limited to the above-described embodiments and may be embodied in various modified forms. In the above-described embodiments, the size and shape are not limited to those illustrated in accompanying drawings, and may be modified appropriately as far as the effects of the present invention can be exerted. Other modifications may be also made appropriately without departing from the scope of the object of the present invention.

What is claimed is:
1. A radiation measurement device, comprising:
a radiation detector configured to generate a detection signal containing a weak signal in accordance with energy of an incident radiation thereof;
a signal processor configured to receive the detection signal from the radiation detector and detect the weak signal from the detection signal, the signal processor includes:
a first pulse detector configured to
receive the detection signal,
add noise to the received detection signal, and
process the noise-added detection signal using a first threshold, to thereby output a first threshold processing signal having a first pulse waveform component, which corresponds to an interval in which a level of the noise-added detection signal exceeds the first threshold,
a second pulse detector configured to
receive the detection signal in parallel with the first pulse detector, and
process the detection signal using a second threshold, to thereby output a second threshold processing signal having a second pulse waveform component, which corresponds to an interval in which a level of the detection signal exceeds the second threshold, and a determining circuit configured to determine whether each of the first and second pulse waveform components conforms to the weak signal; and a dosimeter configured to calculate a radiation dose based on an output signal from the signal processor, by respectively applying first and second dose coefficients to the first and second pulse waveform components.

2. The radiation measurement device of claim 1, wherein the first and second dose coefficients are provided in accordance with an amplification level of the weak signal at the first and second pulse detectors, respectively.

3. The radiation measurement device of claim 2, wherein the determining circuit selects the second pulse waveform component upon determining that both the first and second pulse waveform components conform to the weak signal.

4. The radiation measurement device of claim 3, wherein the first threshold processing signal has a plurality of first pulse waveform components, the second threshold processing signal has a plurality of second pulse waveform components, and the signal processor further includes a pulse counter configured to separately count the plurality of first pulse waveform components and the plurality of second pulse waveform components, responsive to the determination by the determining circuit that the plurality of first and second pulse waveform components both conform to the weak signal.

5. The radiation measurement device of claim 2, wherein the first threshold processing signal has a plurality of first pulse waveform components, the second threshold processing signal has a plurality of second pulse waveform components, and the signal processor further includes a pulse counter configured to separately count the plurality of first pulse waveform components and the plurality of second pulse waveform components, responsive to the determination by the determining circuit that the plurality of first and second pulse waveform components both conform to the weak signal.

6. The radiation measurement device of claim 1, wherein the determining circuit selects the second pulse waveform component upon determining that both the first and second pulse waveform components conform to the weak signal.

7. The radiation measurement device of claim 6, wherein the first threshold processing signal has a plurality of first pulse waveform components, the second threshold processing signal has a plurality of second pulse waveform components, and the signal processor further includes a pulse counter configured to separately count the plurality of first pulse waveform components and the plurality of second pulse waveform components, responsive to the determination by the determining circuit that the plurality of first and second pulse waveform components both conform to the weak signal.

8. The radiation measurement device of claim 1, wherein the first threshold processing signal has a plurality of first pulse waveform components, the second threshold processing signal has a plurality of second pulse waveform components, and the signal processor further includes a pulse counter configured to separately count the plurality of first pulse waveform components and the plurality of second pulse waveform components, responsive to the determination by the determining circuit that the plurality of first and second pulse waveform components both conform to the weak signal.

\* \* \* \* \*